United States Patent [19]

Ortelt et al.

[11] Patent Number: 5,919,859
[45] Date of Patent: Jul. 6, 1999

[54] AQUEOUS RESIN DISPERSIONS

[75] Inventors: Martina Ortelt, Marl; Hartwig Lange, Haltern; Klaus Janischewski, Dorsten, all of Germany

[73] Assignee: Huels Aktiengesellschaft, Marl, Germany

[21] Appl. No.: 08/953,247

[22] Filed: Oct. 17, 1997

[30] Foreign Application Priority Data

Oct. 23, 1996 [DE] Germany .......................... 196 43 704

[51] Int. Cl.⁶ .............................. C08J 3/00; C08K 3/20; C08L 75/00
[52] U.S. Cl. .......................... 524/591; 524/839; 524/840
[58] Field of Search .................................... 524/591, 839, 524/840

[56] References Cited

U.S. PATENT DOCUMENTS 4,983,662  1/1991  Overbeek et al. ...................... 524/501

FOREIGN PATENT DOCUMENTS 0617103  9/1994  European Pat. Off. .
24 08 865  9/1975  Germany .
1333728  10/1993  United Kingdom .

OTHER PUBLICATIONS

Database WPI, Derwent Publications, AN 88–238215, JP 63–170468, Jul. 14, 1988.

*Primary Examiner*—Patrick D. Niland
*Attorney, Agent, or Firm*—Oblon, Spivak, McClelland, Maier & Neustadt, P.C.

[57] ABSTRACT

Aqueous resin dispersions obtainable by reaction, or partial reaction, of

I. hydroxyl-containing ketone, ketone/aldehyde and/or urea/aldehyde resins or hydrogenated follow-on products thereof and II. at least one hydrophilically modified isocyanate and/or polyisocyanate having at least one free NCO group, obtained by reacting at least one isocyanate and/or polyisocyanate with compounds which in addition to the hydrophilic or potentially hydrophilic group have at least one isocyanate-reactive function and which possess a hydrogen which is active according to the Zerewitinoff test, and which also possess at least one hydrophilic group and/or one potentially hydrophilic group, and then combining the neutralized resin with water.

20 Claims, No Drawings

AQUEOUS RESIN DISPERSIONS

BACKGROUND OF THE INVENTION

1. Field of the Invention

The present invention relates to aqueous ketone, ketone/aldehyde or urea/aldehyde resin dispersions, to a process for their preparation and to their method of use.

2. Discussion of the Background

The condensation of ketone, ketone/aldehyde and urea/aldehyde resins is known. They, for example, are described in Ullmann's Encyclopedia of Industrial Chemistry, VCH Verlagsgesellschaft mbH Weinheim 1993, Vol. 23, pp. 99–105, which is incorporated herein by reference. Such resins are generally insoluble in water.

DE-A 25 42 090 describes water-soluble compounds which carry sulfonic acid groups and which, in deviation from the novel process, are obtained in a conjoint condensation reaction from cycloalkanone, formaldehyde and alkali metal bisulfite.

DE7A 31 44 673 indicates water-soluble condensation products which are likewise obtained by conjoint reaction of ketones, aldehydes and compounds which introduce acid groups. Examples of the latter are sulfates and salts of amidosulfonic acid, of aminoacetic acid and of phosphorous acid.

According to DE-A 25 42 090 and DE-A 31 44 673, the products obtained include electrolyte (e.g. Na ions). However, such resins impair, inter alia, the corrosion protection afforded by coating systems.

DE-A 34 06 473 and DE-A 34 06 474, or EP-A 0 154 835, describe processes for preparing stable aqueous dispersions of urea/aldehyde resins or, ketone/(aldehyde) resins, in accordance with which the resin in the melt state or in a highly concentrated solution thereof, is dispersed in water in the presence of organic protective colloids and with or without the addition of emulsifiers. A disadvantage of this process is that the organic protective colloids and emulsifiers interfere with the use of the aqueous ketone/(aldehyde) and urea/aldehyde resins in the coating sector. The hydrophilic protective colloids and, if used, emulsifiers remain in the coating and thus render the coating sensitive to moisture. The coating swells under the action of moisture, loses hardness and suffers a loss of some of its corrosion protection effect.

Thus, it is an object of the present invention to develop a resin dispersion that is stable to hydrolysis and exhibits storage stability, without the disadvantages described above, while at the same time, maintaining properties customary for such resins.

SUMMARY OF THE INVENTION

The object with which the present invention is concerned is achieved by reacting hydroxyl-containing ketone, ketone/aldehyde, and/or urea/aldehyde resins or their hydrogenated products thereof with hydrophilically modified (poly)isocyanates.

Following neutralization and the addition of water, the novel ketone, ketone/aldehyde and/or urea/aldehyde resins modified in this way give rise to stable aqueous solutions, dilutions or dispersions.

In comparison with the systems already known from the prior art the novel aqueous systems are completely stable to hydrolysis and include no interfering additives whatsoever in the form, for example, of emulsifiers, protective colloids or electrolytes.

A more complete appreciation of the invention and many of the attendant advantages thereof will be readily obtained as the same becomes better understood by reference to the following detailed description.

DESCRIPTION OF THE PREFERRED EMBODIMENTS

The present invention provides a composition comprising an aqueous resin dispersion obtained by contacting:

I. a hydroxyl-containing ketone, ketone/aldehyde and/or urea/aldehyde resin or a hydrogenated product thereof, and II. at least one hydrophilically modified isocyanate and/or polyisocyanate having at least one free NCO group, obtained by reacting at least one isocyanate and/or polyisocyanate with a compound which contains a hydrophilic group, and at least one isocyanate-reactive function and which possess a hydrogen which is active according to the Zerewitinoff test, and then combining the neutralized resin with water.

Further, the present composition comprises an aqueous resin dispersion comprising the reaction product of components I and II or reaction product of components I and II in combination with unreacted components I and II. The term "hydrophilic" is used to denote a group that either is hydrophilic or a group that can be converted to a hydrophilic group. Further, a group that can be converted to a hydrophilic group is sometimes called "potentially hydrophilic" in the application. The hydrophilic modification of II is effected by reacting a (poly)isocyanate and/or mixtures of different (poly)isocyanates with compounds having (in addition to the hydrophilic or potentially hydrophilic group) at least one isocyanate-reactive function, for example OH, NH, which has a hydrogen which is active according to the Zerewitinoff test, and having at least one hydrophilic group and/or one potentially hydrophilic group, i.e. a group which becomes hydrophilic after neutralization. Examples of such compounds for hydrophilic modification of the polyisocyanates are aminocarboxylic acids, hydroxysulfonic acids, aminosulfonic acids and also hydroxycarboxylic acids, such as, with particular preference, dimethylolpropionic acid. The hydrophilic modification can also be undertaken with already neutralized compounds.

Further, the term "(poly)isocyanate" is used throughout this application to denote isocyanate or polyisocyanate.

Hydroxycarboxylic acids such as, in particular, dimethylolpropionic acid, are particularly preferred because when neutralized with volatile bases, for example amines, they exhibit a strong hydrophilic effect which, however, recedes sharply when the volatile base evaporates, with the result, for example, that coatings do not soften or whiten under the effect of moisture. Dimethylolpropionic acid is also particularly preferred because by way of its two hydroxyl groups it has the capacity to provide two hydrophobic polyisocyanates with (potentially) hydrophilic modification.

Suitable polyisocyanates for preparing II are, preferably, di- to tetra-functional polyisocyanates having a molar mass of below 800 g/mol and having isocyanate groups attached to an alkyl group; "alkyl" in the present application denotes an aliphatic group, which may be a straight chain or branched, a cycloaliphatic or a combination thereof as are commonly employed and well known to those skilled in the field of polyurethane coating materials. Preferred polyisocyanates include but are not limited to: 1-isocyanato-3,3,5-trimethyl-5-isocyanatomethylcyclohexane,(isophorone diisocyanate IPDI), trimethylhexamethylene diisocyanate (TMDI), 1,6-diisocyanatohexane (HDI), bis(4- isocyanatohexyl)methane ($H_{12}MDI$); additional suitable polyisocyanates are listed in DE-A 24 56 469, pp. 5 and 6.

Less preferred, but suitable for the invention, are oligomers which are obtainable from the monomeric polyisocyanates in accordance with the prior art, as described, for example, in Journal für Praktische Chemie 336 (1994), 185–200 and Farbe und Lack 100, 5 (1994), 330–335 and the literature references indicated therein. These are polyisocyanates having a biuret, uretdione or isocyanurate structure, the latter obtainable by cyclotrimerization of the monomers. Also suitable, moreover, are polyisocyanates as products of polyhydric alcohols and/or of amines with monomeric isocyanates, for example the product of trimethylolpropane and isophorone diisocyanate.

Particular preference is given to a hydrophilically modified polyisocyanate (component II) prepared from dimethylolpropionic acid and isophorone diisocyanate (IPDI) in a molar ratio of 1:2. The reaction of components I and II can be carried out without solvent or, preferably, in the presence of an auxiliary solvent. When an auxiliary solvent is used, preferred solids contents are from 50 to 95% by mass, particularly preferably from 60 to 80% by mass based on the total mass of components I and II.

Suitable auxiliary solvents are either, preferably, those which have a boiling point of below 100° C. at 1013 hPa and which can be separated off from the finished aqueous system, down to a residual content of ≦0.5% by mass, and re-used, for example acetone, methyl ethyl ketone or tetrahydrofuran; or, less preferably, those which may be higher-boiling and which remain in the water-dilutable system, for example butylglycol, butyl diglycol or N-methylpyrrolidone. The auxiliary solvents which boil below 100° C. are preferred because they make it possible to prepare purely aqueous, solvent-free and thus particularly environmentally compatible dispersions. The use of the higher-boiling solvents—in whole or in part—or solvent mixtures with a boiling point above 100° C., although technically possible, is not preferred. An advantage of the novel process, indeed, is that it is possible to carry out the process entirely without organic solvents in the finished aqueous resin dispersion and nevertheless to obtain high-solids stable dispersions.

The reaction of components I and II is preferably allowed to proceed to such an extent that the residual NCO content is less than 1% NCO (determined in accordance with DIN 53185) and with particular preference is allowed to proceed to an extent such that the residual NCO content of the product of components I and II is in the range from 0.1 to 0.5% NCO. NCO functions which remain unreacted in the reaction of components I and II can, as is known in the art, either be used for chain extension reactions, for example by addition of polyamines or water, or, if desired, chain termination can be initiated by adding compounds which are monofunctional with respect to NCO groups (e.g. monoalcohols, monoamines).

The resins prepared in accordance with the invention can be neutralized with inorganic and organic bases, for example ammonia or organic amines. It is preferred to use primary, secondary and tertiary amines, for example ethylamine, propylamine, dimethylamine, dibutylamine, cyclohexylamine, benzylamine, morpholine, piperidine and triethanolamine. Particular preference is given to volatile tertiary amines, especially dimethylethanolamine, diethylethanolamine, 2-dimethylamino-2-methyl-1-propanol, triethylamine, tripropylamine and tributylamine.

The amount of neutralizing agent depends on the content of potentially neutralizable groups in the hydrophilically modified polyisocyanate and is preferably from 50 to 130% of the amount necessary for stoichiometric neutralization.

The neutralized hydrophilic resin or the resin solution is either passed into water or has water added to it, preferably with stirring. Prior to the addition of water it is possible to combine the reaction product of components I and II with, if desired, further resins, which have not been hydrophilically adjusted, or with other components, and then to disperse these combinations together. By this method it is possible to obtain an industrially advantageous, high solids content of the dispersions, of more than 45% by mass based on the total amount of the dispersion. Following dispersion, the organic auxiliary solvent is preferably removed under reduced pressure and, if desired, is reprocessed.

The novel resin dispersions exhibit good storage stability and are suitable as resins or additive resins in coating materials such as paints and printing inks, for example. They are also suitable for aqueous ballpoint pen pastes and inks. Such resin dispersions are also suitable for use in adhesives, for example for the bonding of textiles, leather, paper and similar materials.

The dispersions of the present invention show good wetting properties, even in combination with organic pigments that are difficult to disperse, and can therefore be used as a gloss-promoting additive resin in paste binders.

Owing to the usually very high softening point combined with good solubility and compatibility, the resulting coatings show rapid initial drying and through-drying, and good blocking resistance.

Having generally described this invention, a further understanding can be obtained by reference to certain specific examples which are provided herein for purposes of illustration only and are not intended to be limiting unless otherwise specified.

Further, the following Examples have been presented in priority document German patent application 196 43 704.0 on which the present application was based and which is incorporated herein by reference.

EXAMPLE

Preparing the Hydrophilically Modified Polyisocyanate II and Reacting it with I 444 g of isophorone diisocyanate are added with stirring to a mixture of 134 g of dimethylolpropionic acid (DMPA), 380 g of acetone and 6 g of a 10% strength by mass solution of dibutyltin dilaurate (DBTL) in acetone at a rate such that the exothermic reaction remains readily manageable. The mixture is then stirred further at 60° C. until the DMPA has completely dissolved and the NCO number of the solution has fallen below 8.7% NCO (determined in accordance with DIN 53185).

The solution is cooled to room temperature, 2300 g of a 55% strength by mass solution in acetone of an acetophenone/formaldehyde resin subsequently hydrogenated in respect of the keto function (KUNSTHARZ SK synthetic resin from Huels AG) and 12 g of a 10% strength by mass solution of DBTL in acetone are added, and the mixture is heated to the reflux temperature of about 60° C. Stirring is continued at this temperature until the NCO number of the solution has fallen below 0.3% NCO.

2) Dispersing the Hydrophilically Modified Resin Obtained from I and II

Alternative A:

The solution of the hydrophilically modified resin as prepared under 1) is neutralized at room temperature, with stirring, by addition of 89 g of dimethylaminoethanol and the solution is dispersed by introducing 4200 g of fully deionized water, again with stirring. The auxiliary solvent, acetone, and some of the water are removed under reduced pressure to give a storage-stable, fine, slightly opalescent resin dispersion having a solids content of about 33% by mass.

Alternative B:

To the solution prepared under 1) there are added, with stirring, 3300 g of a 55% strength by mass solution, in acetone, of an acetophenone/formaldehyde resin subsequently hydrogenated with respect to the keto group (KUNSTHARZ SK available from Huls AG), the mixture is neutralized at room temperature and with stirring using 89 g of dimethylaminoethanol, and the solution is dispersed by introducing 4400 g of fully deionized water, again with stirring. The auxiliary solvent, acetone, and some of the water are removed under reduced pressure to give a storage-stable, whitish dispersion having a solids content of about 50% by mass based on the total mass of the dispersion.

Properties of the Dispersion and Pigment Pastes Prepared therefrom Storage Stability The dispersions A and B of Section 2) were investigated for storage stability in respect of changes in pH, in viscosity and in visual appearance.

| Property | A | B |
| --- | --- | --- |
| pH: | | |
| Initial value | 8.9 | 8.8 |
| After ½ year | 8.9 | 8.8 |
| Viscosity 23° C.* | | |
| Initial value | 375–714 mPa · s | 69–138 mPa · s |
| After ½ year | 335–563 mPa · s | 67–135-mPa · s |
| Appearance: | | |
| After preparation | Slightly opalescent | White |
| After ½ year | Slightly opalescent | White |

*Rotary viscometer; D: 100 to 900 s$^{-1}$

Testing the Pigment Wetting

White pigment concentrates were prepared in the customary manner using the dispersions A and B of Section 2).

| | Amounts in parts by weight | |
| --- | --- | --- |
| Constituent | A | B |
| KRONOS 2190 ® | 63.0 | 63.0 |
| Dispersion | 16.3 | 10.8 |
| DISPERBYK 181 ® | 2.0 | 2.0 |
| DISPERBYK 184 ® | 4.8 | 4.8 |
| BYK-022 ® | 0.5 | 0.5 |
| AEROSIL 200 ® | 0.3 | 0.3 |
| Water (demineralized) | 13.1 | 18.6 |
| Pigment concentrate | 100.0 | 100.0 |

The pigment concentrates had good rheological properties and good flocculation stability.

The pigment concentrates were made up to the coating material by adding 20 parts by weight of pigment concentrate to the alkyd/melamine resin coating base system indicated below. In this context it was possible to mix in the pigment concentrates without problems.

Alkyd/melamine resin system

| WORLEESOL 61 A ® | 47.8 parts by weight |
| --- | --- |
| CYMEL 327 ® | 8.6 parts by weight |
| Butylglycol | 3.9 parts by weight |
| Dimethylethanolamine | 2.4 parts by weight |
| BYK 301 ® | 0.2 parts by weight |
| Water (demineralized) | 37.1 parts by weight |
| Coating base binder | 100.0 parts by weight |

Paint films on steel plate were prepared and evaluated in the customary manner.

| property tested | A | B |
| --- | --- | --- |
| Gloss 60° | 93 | 98 |
| Pendulum hardness (König) DIN 53 157 | 120 s | 106 s |
| Indentation (Erichsen) DIN 53 156 | 7.5 mm | 8.5 mm |
| Adhesion (crosshatch) DIN 53 151 | 0 | 0 |

What is claimed as new and desired to be secured by Letters Patent of the United States is:

1. An aqueous resin dispersion obtained by contacting components (I) and (II) consisting of:
   I. a hydroxyl-containing compound selected from the group consisting of a ketone, a ketone/aldehyde, a urea/aldehyde resin and a hydrogenated product of said hydroxyl-containing compound thereof; and
   II. at least one hydrophilically modified isocyanate or polyisocyanate having at least one free NCO group; said hydrophilically modified isocyanate obtained by reacting at least one isocyanate or polyisocyanate with a compound containing at least one hydrophilic group and, at least one isocyanate-reactive finction, and
   wherein said hydroxyl-containing compound contains a hydrogen which is active according to the Zerewitinoff test; and
   neutralizing said resin and then combining the neutralized resin with water.

2. The resin dispersion as claimed in claim 1, wherein said dispersion comprises the reaction product of said components I and II.

3. The resin dispersion as claimed in claim 1, wherein said dispersion comprises the reaction product of said components I and II in admixture with unreacted said components I and II.

4. The resin dispersion as claimed in claim 1, wherein component II is prepared using a tertiary amino alcohol, an aminocarboxylic acid, an hydroxysulfonic acid, an aminosulfonic acid or an hydroxycarboxylic acids.

5. The resin dispersion as claimed in claim 1, wherein component II is prepared using dimethylolpropionic acid.

6. The resin dispersion as claimed in claim 1, wherein component II is neutralized before reaction with component I.

7. The resin dispersion as claimed in claim 1, wherein component II is prepared using a di- to tetra-functional polyisocyanate having a molar mass of below 800 g/mol.

8. The resin dispersion as claimed in claim 1, wherein component II is prepared using a polyisocyanate having at least one isocyanate group attached to an aromatic, an aliphatic or a cycloaliphatic structure, or mixtures thereof.

9. The resin dispersion as claimed in claim 1, wherein said isocyanate or polyisocyanate is selected from the group consisting of 1-isocyanato-3,3,5-trimethyl-5-isocyanatomethylcyclohexane.(isophorone diisocyanate IPDI), trimethylhexamethylene diisocyanate (TMDI), 1,6-diisocyanatohexane (HDI) and bis(4-isocyanatohexyl) methane ($H_{12}MDI$).

10. The resin dispersion as claimed in claim 1, wherein component II is prepared using a polyisocyanate having a biuret, uretdione or isocyanurate structure.

11. The resin dispersion as claimed in claim 1, wherein component II is prepared using a polyisocyanate from the reaction of a polyhydric alcohol or of an amine with a monomeric isocyanate.

12. The resin dispersion as claimed in claim 1, wherein component II is prepared using dimethylolpropionic acid and isophorone diisocyanate (IPDI) in a molar ratio of 1:2.

13. The resin dispersion as claimed in claim 1, wherein the reaction of component I with component II and the dispersion is carried out in the absence of solvent.

14. The resin dispersion as claimed in claim 1, wherein the reaction of component I and component II and the dispersion is carried out in the presence of an auxiliary solvent.

15. The resin dispersion as claimed in claim 14, wherein said auxiliary solvent has a boiling point of below 100° C. at 1013 hPa.

16. The resin dispersion as claimed in claim 14, wherein said auxiliary solvent is selected from the group consisting of acetone, methyl ethyl ketone, tetrahydrofuran and a mixture thereof.

17. The resin dispersion as claimed in claim 6, wherein component II is neutralized with an inorganic or organic base.

18. The resin dispersion as claimed in claim 6, wherein component II is neutralized with a compound selected from the group consisting of dimethylethanolamine, diethylethanolamine, and 2-dimethylamino-2-methyl-1-propanol.

19. The resin dispersion as claimed in claim 6, wherein component II is neutralized with from 50 to 130% of the amount of neutralizing agent required for stoichiometric neutralization.

20. The resin dispersion as claimed in claim 1, wherein prior to combination of said resin with water one or more components are added which are not soluble in water or dilutable in water.

\* \* \* \* \*